United States Patent [19]

Blackman

[11] 4,014,215
[45] Mar. 29, 1977

[54] CLINICAL GLASS THERMOMETER HAVING A STEM AND A BULB INTEGRALLY FORMED THEREWITH

[76] Inventor: Seymour N. Blackman, 284 E. Palisades Ave., Englewood, N.J. 07603

[22] Filed: Feb. 12, 1975

[21] Appl. No.: 549,325

Related U.S. Application Data

[60] Division of Ser. No. 453,324, March 21, 1974, Pat. No. 3,884,666, which is a continuation-in-part of Ser. No. 219,308, Jan. 20, 1972, abandoned.

[52] U.S. Cl. ............................................. 73/371
[51] Int. Cl.² ...................................... G01K 5/02
[58] Field of Search .......... 73/371; 65/DIG. 9, 121; 73/372, 373, 374, 375, 376, 377, 378

[56] References Cited

UNITED STATES PATENTS

| | | | |
|---|---|---|---|
| 278,380 | 5/1883 | Weinhagen | 65/DIG. 9 |
| 309,050 | 12/1884 | Hicks | 73/371 |
| 317,783 | 5/1885 | Hicks | 65/DIG. 9 |
| 1,059,857 | 4/1913 | Frankenberg | 73/371 |

Primary Examiner—Donald O. Woodiel
Attorney, Agent, or Firm—Kirschstein, Kirschstein, Ottinger & Frank

[57] ABSTRACT

A monocoque clinical glass thermometer which constitutes a glass stem and a bulb formed integrally therewith. The thermometer has a straight opaque background strip embedded therein on the side of the capillary bore opposite from the lens. The strip extends from the upper end of the thermometer stem down into a wall of the bulb. The portion of the strip in the wall of the bulb is a straight continuation of the balance of the strip and is not twisted. The outer surface of the bulb is free from irregularities such as flash and preferably is cylindrical as in a clinical thermometer with a stubby cylindrical bulb or a long cylindrical bulb. The bulb and stem are not only integral, they are formed from a single piece of glass so that residual stress is at a minimum and so that the formulations of the glass for the bulb and stem are the same, thereby lessening the possibility that strain may be created during the lifetime of the thermometer.

2 Claims, 11 Drawing Figures

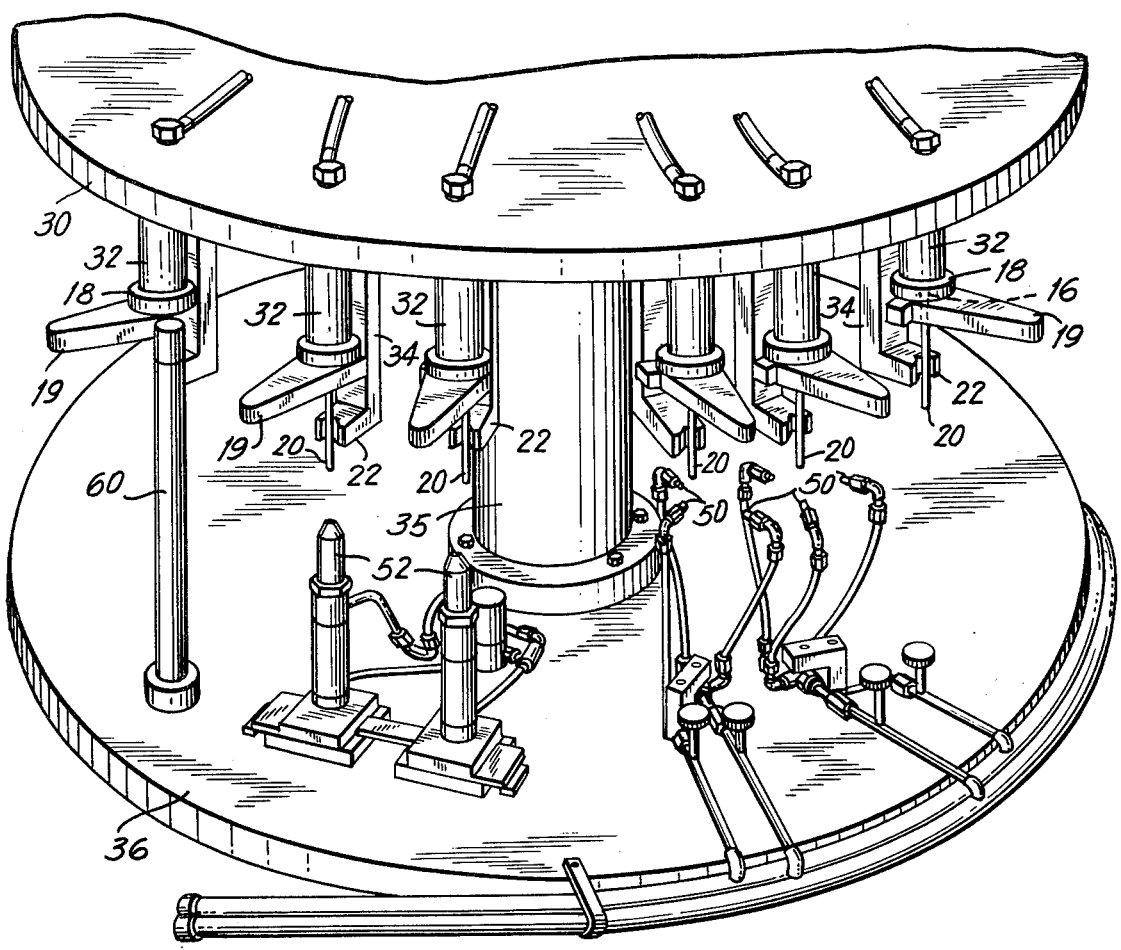
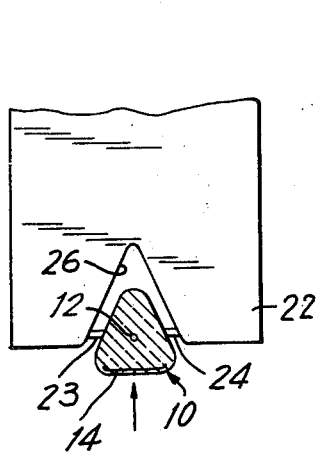
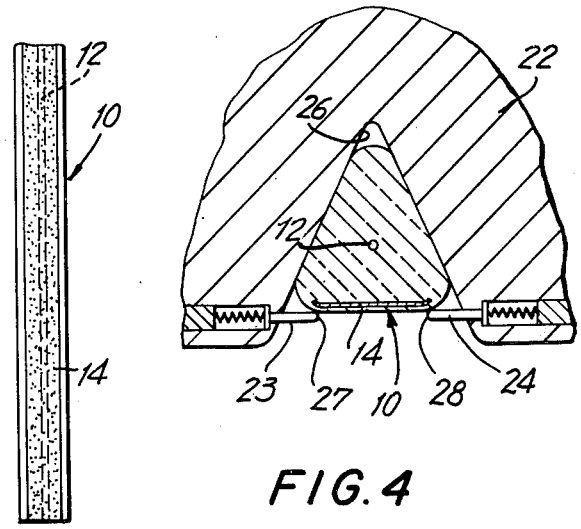

CLINICAL GLASS THERMOMETER HAVING A STEM AND A BULB INTEGRALLY FORMED THEREWITH

CROSS-REFERENCE TO RELATED APPLICATIONS

This application is a divisional application of application Ser. No. 453,324 filed Mar. 21, 1974, now U.S. Pat. No. 3,884,666, for CLINICAL MONOCOQUE GLASS THERMOMETER AND METHOD OF MAKING THE SAME, which is a continuation-in-part of application Ser. No. 219,308 filed Jan. 20, 1972 now abandoned, for METHOD OF MAKING A CLINICAL THERMOMETER HAVING A BULB INTEGRALLY FORMED THEREWITH.

BACKGROUND OF THE INVENTION

1. Field of the Invention

A monocoque glass clinical thermometer in which the bulb and stem are formed from the same piece of glass and in which the exterior of the bulb is of circular, preferably cylindrical, section and is completely free of protuberances that give rise to irritation in normal use of the thermometer.

2. Description of the Prior Art

In the prior art it has been conventional to form clinical glass thermometers by fusing to the bottom of the stem a previously formed bulb of thin section in suitable configuration. The stem was made from standard Corning lead thermometer glass and the bulb was made from a different type of material which was dimensionally stable upon stress relief at room temperature. Clinical thermometers so made had a high reject rate which was caused from internal undercuts that arose from misalignment of the walls of the stem and the bulb. These undercuts resulted in air being trapped therein; the air caused splits or gaps in the mercury column.

Furthermore, particles of dust often would become lodged in the thermometer during the fusing of the bulb to the stem, particularly so because the bulb was of comparatively large diameter and air-borne particles of dust easily could float into the same. These particles tended to enter the capillary bore during loading of the thermometer and also use of the thermometer, thereby creating thermometers known as "hard shakers", these being thermometers in which the mercury column would not readily recede after using the same to measure a temperature even when they were whipped quite rapidly.

To overcome the difficulty with thermometers formed from separate stem blanks and bulbs of different materials, it has been proposed to form thermometers as shown in McGill U.S. Pat. No. 3,285,727. In this patent the bulb of the finished thermometer was in one piece with the glass of the stem. Indeed, the bulb was formed from one end of a thermometer blank. Pursuant to the patent, the thermometer blank was held upright and the top portion heated to flow temperature of the glass. The upper end of the blank was cut with a gas jet which concurrently closed the capillary bore. Pressurized gas was introduced into the bore resulting in expansion of the closed end of the bore and the corresponding portion of the side walls of the blank. Next, the bulb was rotated between cylindrical rollers to bring the bulb to a desired shape. Alternatively, the bulb was rotated with non-cylindrical dies to provide bulbs of different shapes. In this method, however, the rotation of the stem and of the rotary dies cuased the opaque strip against which the mercury column was to be read to be severely twisted resulting in an unsightly spiral within the bulb. Furthermore, the use of a rotating blank and a rotating die member or members resulted in unevenness of the walls of the thermometer bulbs which made them more susceptible to breakage. Still further, this method did not provide a desired smooth shape for the extreme tip of the bulb. In addition, the apparatus to form the aforesaid steps was relatively expensive and the process for operating the apparatus was expensive and required the use of skilled help, thus increasing the price of the thermometer. Finally, the rejects of thermometers so made were quite high, which, too, increased the expense of such thermometers as sold to the public.

It also has been proposed in a Chancy U.S. Pat. No. 2,990,648 to form bulbs on thermometer stems which bulbs were made of the same glass as the stems and, indeed, in one piece therewith. These thermometers used as gas flame to seal the lower end of a vertically held thermometer blank, slightly expanded the bore at the closed end by introducing gas under pressure into the bore, and then while the bulb still was at a temperature sufficiently high to enable the glass therein to flow, introduced the bulb into a split cavity mold where the bulb was inflated to the configuration of the inside of the mold. The method disclosed by Chaney was used only in connection with non-clinical thermometers. The stem and the bulb had a flat side designed to be placed against a reading scale. The stem never was marked, as was conventional with a clinical thermometer, either with recessed markings or stain markings. The method disclosed by Chaney had the serious defect that the cavity left flash marks on the bulb which, of course, was no particular problem insofar as Chaney was concerned because a commercial thermometer never is intended to be inserted into a body orifice, so that the flash on the bulb never created an irritation as it would have if it were on a bulb in a clinical thermometer.

SUMMARY OF THE INVENTION

1. Purposes of the Invention

It is an object of an invention to obtain an improved clinical glass thermometer.

Other objects of the invention will in part be obvious and in part be pointed out hereinafter.

2. Brief Description of the Invention

The clinical monocoque glass thermometer of the present invention is formed by a method which includes making a thermometer by starting with a glass blank. The blank is held in upright position with a special type of jig, although this is not necessary to the practice of the invention. While so held, the lower end of the blank is free. This end is subjected to heating with a flame that concentrates its heat at a point above the lower tip of the blank. The heat brings the glass at the zone where the same is directed to flow temperature. Under the influence of gravity the portion of the stem below the heated zone pulls out the heated zone forming the glass into what looks like a very thin taffy strand. Ultimately, the strand breaks and the strand, including the portion of the former blank beneath it, drops to waste. Due to this particular method of applying heat and allowing the scrap to drop away, the lower end of the thermometer blank is formed into a downwardly tapered conical shape and, at the same time, the heat causes the capillary bore normally present in a clinical thermometer blank to close, sealing the lower end of the bore. Next, the still-hot lower end, either with or without further application of heat to keep the same at a suitable temperature for deformation, is introduced into an open-topped cavity of a one-piece mold, i.e., a non-split mold. Then pressurized gas is introduced into the still-open top end of the capillary bore of the blank. This causes the still-hot lower downwardly tapered conical end of the blank to expand so as to form a bulb having a hollow interior and an external surface which engages the walls of the die cavity. Due to the special shape above described of the heated lower end of the blank, the bulb thus formed has a high degree of uniformity of wall thickness, that is to say, the thickness of the side wall of the bulb is approximately equal to the thickness of the rounded bottom wall of the bulb. This has certain desirable effects; one is esthetic. The bottom wall no longer is unusually thick to create a bull's-eye lens effect which was common in previously manufactured thermometers. Moreover, due to the uniform thickness, the side wall is thicker than it would be in a conventional thermometer and, therefore, stronger, while at the same time the bottom wall is thinner than it would be in a conventional thermometer and yet still is thick enough, being approximately equal to the thickness of the side wall, to resist breakage to the same degree as the side wall. Hence, a stronger overall bulb section is created. Moreover, this is accomplished without forming any external protuberances on the bulb that might irritate tender mucous membranes. Preferably, this is accomplished with a bulb that is of cylindrical configuration so far as its side wall is concerned, being either a short cylinder or a long cylinder, depending upon the ultimate desired configuration of the thermometer bulb. Still further, because the bulb is inflated in the die and is not rolled between dies, the opaque background remains essentially as straight in the bulb as it is in the stem. All of the foregoing lends a highly pleasing appearance to the finished thermometer.

Subsequently, the thermometer with the formed bulb thereon is charged with mercury, has thermometer graduations placed on the stem, has the quantity of mercury adjusted to conform to the thermometer, is evacuated and closed, the sequence of steps subsequent to the formation of the bulb varying with the manufacture and depending upon the particular methods employed for charging, forming the markings, closing and evacuating the upper end of the thermometer and adjusting the quantity of mercury therein.

The invention consists in the features of construction, combination of elements and arrangement of parts which will be exemplified in the thermometer hereinafter described and of which the scope of application will be indicated in the appended claims.

BRIEF DESCRIPTION OF THE DRAWINGS

In the accompanying drawings in which is shown one of the various possible embodiments of the invention:

FIG. 1 shows a perspective view of an apparatus for holding a clinical glass thermometer blank in a vertical position;

FIG. 2 is a fragmentary view of a thermometer blank used in the formation of the monocoque thermometer the present invention;

FIG. 3 is a top view of the vise and thermometer blank shown in FIG. 1;

FIG. 4 is an enlarged view of the thermometer blank and spring-loaded pins shown in FIG. 3, the thermometer being shown in fully inserted position as distinguished from the partially inserted position of FIG. 3;

PREFERRED EMBODIMENT OF THE INVENTION

Figure 5:
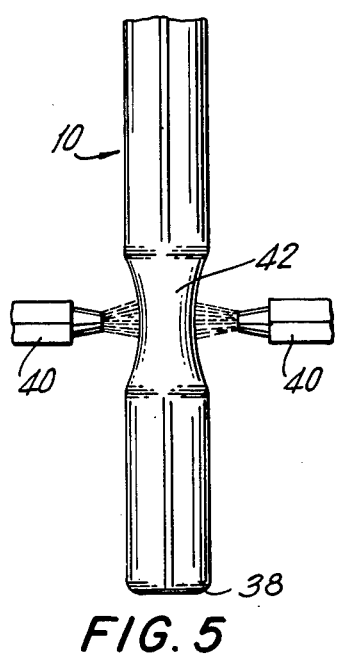
FIG. 5 shows the step of heating the thermometer blank slightly above its lower end to a point where the heated zone of the blank starts to soften and elongate under the force of gravity.

In the clinical glass thermometer field, thermometer bulbs are of three general types. The first has a relatively long and cylindrical shaped bulb and is known as the oral type. The long bulb is employed to obtain maximum contact with the mouth tissues and also to provide a rather large mass of mercury so as to secure a substantial movement of the mercury column over the small temperature range that the human body experiences between normal and fever temperatures.

The second type has a pear-shaped bulb and is known as the rectal type.

The third type has a short cylindrical bulb and is known as the security or stubby type. This latter thermometer may be used either as an oral or rectal thermometer. Like the first type, it has, as just noted, a cylindrical bulb, albeit shorter. While the present invention hereinafter will be described with reference to a stubby type thermometer of the monocoque variety, it is to be understood that this method can be applied equally as well to form clinical thermometers having long cylindrically shaped bulbs or a pear-shaped bulb.

Preferably, however, the present invention constitutes a thermometer with a cylindrical bulb inasmuch as, as has been mentioned previously, the unique configuration of the lower end of the bulb after the closing of the capillary bore lends itself peculiarly well to the formation of uniform side wall and bottom wall thicknesses in a cylindrical bulb.

Referring now in detail to the apparatus shown in FIG. 1, a thermometer blank 10 is illustrated having a capillary bore 12 extending lengthwise thereof and formed therein prior to use of the blank in the method of the present invention. The blank also has an opaque strip 14 embedded into the blank extending longitudinally thereof. This strip is quite well known in the art, being employed as a background against which to read the height of the mercury column in the capillary bore 12 after the bulb has been inserted into a body cavity which causes the mercury in the bulb to expand and rise in the bore. The blank has a conventional cross-section which is best shown in FIGS. 3 and 4. It is basically of triangular shape with rounded corners at the back of the thermometer which is the portion wherein the strip is embedded and it also has a rounded corner at the front of the thermometer. The rounded corner at the front of the thermometer functions as a lens, as is well known, to visually enlarge the capillary bore which is too thin to be seen by a naked eye. Conventionally, the three sides of the thermometer essentially are flat.

The upper end 16 of the blank 10 is vertically held within a conventional chuck 18 with which there is associated a standard release and tightening mechansim 19, the details of which are unimportant to the present invention. It is sufficient to observe that the mechanism 19 in one position will tighten the chuck on the upper end of the blank and in another position will release the chuck. An intermediate portion 20 of the blank is held by a vise 22 the construction of which is an ancillary feature of the present invention.

The chuck 18 clamps or grips the upper end 16 of the thermometer blank 10 with a force that is sufficient to prevent the blank 10 from falling downwardly. However, it is sufficiently light to prevent breaking the glass blank. Moreover, the chuck includes a resilient seal such, for instance, as an O-ring which surrounds a portion of the blank immediately below the upper tip thereof and forms therewith an air-tight seal.

The holding vise 22 includes spring-loaded pins 23, 24, illustrated in FIG. 3, which are so positioned that when the blank is within the vise, said pins will held the blank 10 in a V-shaped slot 26 thereof. This assists in maintaining the blank in a vertical position. This type of vise also facilitates easy loading of the thermometer blank into and unloading of the thermometer blank from the chuck 18. As can be readily seen in FIG. 4, the tips 27 and 28 of the pins 23 and 24 are rounded so as to enable these pins to be forced into openings in the vise when the thermometer blank is thrust into the slot 26. The rounded front corner of the thermometer blank enters between the pins 23, 24 and the side walls of the blank cam apart the pins as the blank enters the slot 26. The pins are spring-loaded to an outwardly extending position, but upon being thus cammed in, easily yield to permit entrance of the thermometer blank into and full seating of the blank upon the side walls of the slot 26, after which the pins snap back out again to the position shown in FIG. 4 where they rest against the back surface of the thermometer blank to hold the blank in the vise 22 while the upper end of the blank is being held in the chuck 18. It will be appreciated that the blank can be inserted into the vise first while the upper end of the blank is below the chuck, and that after the blank has been placed in the vise it can be moved longitudinally upwardly to engage the chuck.

The chuck 18 and the vise 22 are attached to the undersurface of a rotatable disc 30, shown in FIG. 1, by tubes 32 and brackets 34, respectively. Several such chucks and associated vises thus are secured to the disc 30 which constitutes, in essence, a segment of a dial machine that is intermittently advanced as by a Geneva drive. The disc 30 is attached to a supporting column 35. The column 35 passes through a stationary disc 36 that is located below the rotatable disc 30. The column is intermittently rotated so as to intermittently move thermometer blanks 10 in relation to the stationary support disc 36.

Figure 6:
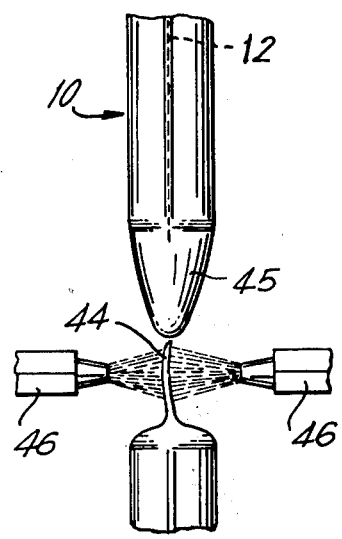
FIG. 6 shows the thermometer blank at the moment that the heated portion has stretched to a thin strand and is separating from the upper part of the blank, the lower end of the upper part of the blank having been formed by the heating and gravity elongation of the heated zone into a downwardly tapering conical tip in which the lower end of the bore is sealed off.
Figure 7:
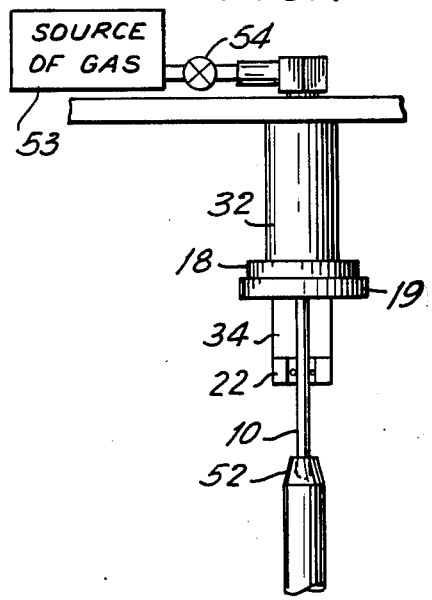
FIG. 7 shows the tapered and still-hot lower portion of the thermometer blank inserted into a one-piece non-split die cavity while gas under pressure is introduced through the top end of the thermometer blank so as to inflate the sealed lower end into the shape of the cavity.
Figure 8:
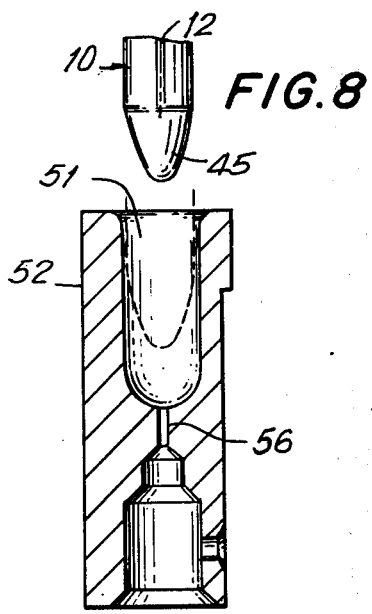
FIG. 8 shows the lower end of the still-uninflated and conically shaped downwardly tapering tip of the thermometer blank while it is above the one-piece non-split upper end of the die cavity, the die cavity being illustrated in section beneath the aforesaid end; also the same figure shows in phantom (dot-and-dash lines) the position of the aforesaid end of the thermometer blank after it has been inserted into the die cavity preparatory to being inflated by pressurized gas.

The particular thermometer blank herein shown is made of standard Corning lead clinical thermometer glass. It is approximately 5 inches long. It is heated approximtely ½ inches from the lower end 38 thereof (see FIG. 5) by gas burners 40 which burners are mounted on the stationary support disc 36. The heated portion of the blank generally is subjected to the action of the burners for approximately 2 to 3 seconds. The burners are so distributed and a sufficient number thereof is provided so that the portion of the blank being heated has its temperature substantially uniformly raised to a temperature above the flow point of the glass, for example, between approximately 1200° F. – 1500° F. Due to the force of gravity on the part of the glass blank below the heated zone, the heated zone begins to stretch and forms an elongated section 42. Further subjection of the blank to heating causes the elongated section to stretch out and thin to a greater degree, ultimately forming a thin, taffy-like strand 44 (see FIG. 6) which eventually separates from the portion of the stem above it. The lower end 45 of the stem of the remaining part of the glass blank still is hot. The force of gravity has caused this lower end to assume a downwardly tapering conical configuration which best is illustrated in FIG. 6. Concurrently, the flow of the glass will close the capillary bore 12 at a point approximately equal to and usually slightly below the part of the stem which has not assumed the conical configuration. Actually, as clearly can be seen in FIGS. 5 and 6, the lower end of the capillary bore is just slightly below the triangular section and actually is slightly into the circular cross-section of the downwardly tapering conical tip 45.

After the tip 45 has been so formed, the blank 10 is moved i.e., indexed, to another position relative to the stationary disc 36. This new position is not indicated because it is not critical to the understanding of the invention. In it, the tip 45 is located centrally of gas jets 50 (see FIG. 1) which uniformly heat the conical tip 45 maintaining it as flow temperature. However, because the tip is of conical configuration, it already has reached the angle of repose of the glass under the influence of gravity at the aforesaid temperature and will not flow any further. All that occurs is that the heat becomes uniformly distributed throughout the tip 45 preparatory to inflation of the closed end of the capillary bore. To speed up production, all stations are provided in pairs. Accordingly, two such sets of gas jets 50 will be seen in FIG. 1.

Next, the blank 10, now having the downwardly tapered conical tip 45 which is uniformly heated to above the flow point of the glass, is indexed to a further position with respect to the stationary support. In such position, the heated tip 45 is located above a cavity 51 in a one-piece die 52. Here, too, two dies are illustrated inasmuch as in the machine shown blanks are being operated upon in pairs. Each die 52 is a non-split die, that is to say, it does not consist of two sections which are moved toward and away from each other, in the closed, i.e., abutting, position to form a cavity inasmuch as such a cavity would, when a glass hollow bulb is blown therein, permit the glass to enter into the operating zone between the two die halves thereby creating flash which would defeat the very purpose of a clinical thermometer, to wit, the ability to insert the same in a body orifice lined with tender mucous membranes. The die cavity 51 has a configuration which matches the desired ultimate configuration of a bulb 54 eventually to be formed at the lower end of the thermometer, blank 10, except for the transformation section between the unblown part of the thermometer blank (the part immediately above the bulb and the bulb itself). The thermometer blank, as has been pointed out previously, is of triangular configuration in cross-section. However, the bulb is circular in cross-section, this, too, having been mentioned earlier. The transformation section merges the circular cross-section of the bulb into the triangular cross-section of the blank which subsequently will be the stem of the finished thermometer.

In the figures, the cavity 51 is shown as having a shape which corresponds to the cylindrical configuration of a stubby type thermometer. It equally well could have been the configuration of an oral type thermometer. In either event, the cavity 51 is of a uniform circular cross-section, except for the bottom which is rounded and concave to impart a convex configuration to the lower end of the bulb. Attention is called to the fact that the diameter of the circular cavity 51 is somewhat larger than the imaginary circumscribing cylinder for the therometer blank. In a preferred embodiment of the invention, the diameter of the cavity is approximately 15% greater than the diameter of the aforesaid imaginary circumscribing cylinder. Attention also is directed to the fact that the position of the apex of the tip 45 is above the bottom of the cavity 51. The importance of this will be pointed out subsequently. The bottom of the cavity is provided with a vent passageway 56 which opens to the atmosphere.

The gas which is introduced into the open upper end of the capillary bore is under a mild pressure such as is commonly employed for blowing a glass bulb from a capillary bore in a clinical thermometer. A typical pressure is 20 to 25 lbs. per square inch. Preferably, an inert gas such as nitrogen is used.

Figure 9:
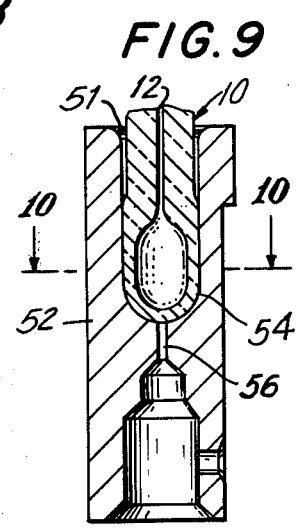
FIG. 9 is a view similar to FIG. 8 but illustrating the lower end of the blank within the die after the lower end has been inflated and thereby the finished shape of bulb attained.

Prior to introducing the gas, the heated conical lower end of the thermometer blank has been thrust fully into the die cavity 51 as shown in FIG. 9. The lower part of the triangular stem also is within the cavity. However, the apex of the conical tip is spaced from the bottom wall of the die cavity by an amount suitable to locate the finished bulb properly, i.e., in its desired position with respect to the triangular part of the thermometer blank. In other words, the tip will be expanded to the shape of a bulb with a hollow interior, the exterior surface of the bulb filling the empty portion of the die cavity which is below the tip prior to inflation.

When the pressurized gas is introduced into the upper end of the thermometer blank as aforesaid, the lower end of the capillary bore will cause a pocket to be formed within the hot conical downwardly tapering tip of the thermometer blank. This pocket ultimately will become the interior of the bulb of the finished thermometer. As the pocket is formed, the glass of the tip is forced downwardly and at the same time expanded radially outwardly. Due to the fact that the tip is of conical configuration, this dual movement of the glass in the tip has been found to form a bulb in which the side wall has substantially the same thickness as the bottom wall of the bulb, this uniform thickness being illustrated in FIG. 9. Phrased differently, the pressure of the gas, as it forms the pocket, expands and blows out the pocket concurrently in downward and radially outward directions. It will be observed that if the die cavity did not confine the bulb as it was being expanded, it would form a ball, and the thickness of the wall would not be uniform as it is with the confining restraint exercised by the aforesaid die cavity.

The transformation section between the bulb and the cylindrical remaining portion of the thermometer blank is gradual and rounded. It does not tend to blow out too markedly because this transformation zone is not as hot and therefore does not flow as readily as the more highly heated downwardly tapering conical tip. Hence, the transformation section provides an attractive blend between the cylindrical configuration of the bulb and the triangular configuration of the thermometer blank immediately above the bulb.

The die cavity 51 has a 1°– 2° taper, being larger at the top than at the bottom to permit the bulb to be withdrawn readily from the cavity after the bulb has been formed by blowing.

Although, as shown in the drawings, the diameter of the bulb is greater than the diameter of the circumscribing cylinder for the triangular portion of the unblown blank, it is within the scope of the invention to form the bulb to a diameter which is less than the aforesaid circumscribing cylinder. In general, if a uniform wall thickness for the side wall and bottom wall of the bulb is to be secured, it is preferred that the bulb diameter not exceed or be less than the diameter of the circumscribing cylinder by more than 20%. Indeed, a greater or smaller bulb diameter would be esthetically unacceptable. If the bulb diameter were greater than the indicated percentage, the wall of the bulb would be too thin and too likely to break, it would be of a thickness which was thinner than the bottom of the bulb, which is undesirable, and it would not fit into openings of commercial centrifuges which are employed for re-setting the mercury column. If the bulb diameter were smaller than indicated, the graduations would be too close together to read and, moreover, the wall thicknesses no longer would be substantially uniform, i.e., the side and bottom wall thickness would vary too greatly from each other.

It will be appreciated that the initial expansion of the downwardly tapered conical tip is both radially outward and downward. The radial outward movement of the glass quickly plugs the die cavity separating the upper portion of the cavity from the lower portion of the cavity. Further blowing causes the now-forming bulb to move downwardly as well as outwardly in the lower portions thereof, thereby reducing the amount of empty space between the undersurface of the aforesaid tip and the bottom part of the die cavity. In order to permit the air which initially is present in the die cavity to escape, the vent 56 has been provided.

It should be mentioned that the gas used is free of moisture and of any particles that might block the capillary bore or check movement of mercury therein or which might react with the mercury. The gas-blowing step during which the bulb is formed is rather rapid. It takes place in approximately 2 to 3 seconds.

After the completion of the bulb-forming step, the thermometer blank is raised to lift the bulb out of the die cavity and the blank is indexed to another station in which the mechanism 19 engages a stationary post 60 attached to the disc 36. As this happens, the chuck is released and the thermometer blank may be pulled out by hand from the vise 22.

The indexing time between the various stations can be quite small, e.g. in the order of ½ to 1½ seconds.

Figure 11:
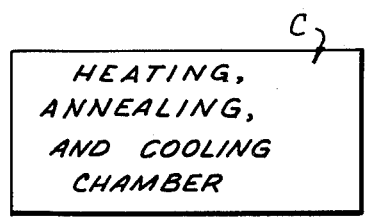
FIG. 11 is a schematic diagram of a heating, annealing and cooling chamber.
Figure 10:
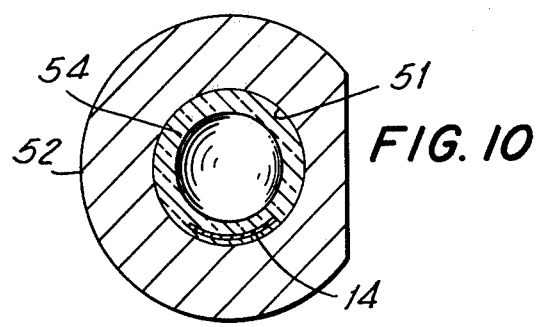
FIG. 10 is a sectional view taken substantially along the line 10—10 of FIG. 9.

The basic operations to to form the thermometer of the present invention now have been completed. They are followed by the usual steps that are employed to complete the fabrication of a clinical thermometer. Thus, the thermometer blank with the bulb thereon is placed in a heating chamber C (see FIG. 11) and there heated and annealed and slowly cooled to leave a negligible residual stress which in the thermometer art is considered to be essentially absent. Typically, the stress as relieved is less than 200 lbs. per square inch. Such thermometer is dimensionally stable so that when mercury is charged into the same the height of the mercury in the bore will not raise over extended periods of idle time. By way of example, the heating and annealing can be carried out by raising the temperature of the thermometer from room temperature to between 660° F. and 860°0 F. or, more specifically, for the glass mentioned, to 820° F. in 30 minutes, holding the thermometer at this temperature for approximately 2 hours which conventionally suffices to stress relieve the thermometer to a commercially acceptable degree. Thereafter, the thermometer is cooled slowly to room temperature, for example, at a rate of 50° F. per hour. When 660° F. is reached, the cooling can be more rapid, for example, 100° F. per hour. After annealing, the thermometer is completed, using standard techniques for charging mercury into the thermometer blank, adjusting the quantity of mercury in the blank, providing graduations on the blank and closing the upper end of the blank.

It thus will be seen that there are provided a device which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interrupted as illustrative and not in a limiting sense.

Having thus described the invention, there is claimed as new and desired to be secured by Letters Patent:

1. A clinical glass thermometer having a stem of triangular cross-section, a capillary bore extending lengthwise within said stem, an opaque strip embedded within said stem and extending longitudinally thereof, and a bulb of circular cross-section, said bulb having side walls and a bottom wall formed integrally with said stem from a single piece of glass, a portion of said opaque strip extending into a side wall of said bulb, said portion of said strip in said side wall being a straight continuation of the balance of said strip in said stem, said side walls of said bulb having a thickness approximately equal to the thickness of said bottom wall, said side walls of said bulb joining said stem with no abrupt reduction of wall thickness.

2. A clinical glass thermometer in accordance with claim 1 wherein said bulb has a diameter equal to or not greater than 20% of the diameter of an imaginary cylinder circumscribing said stem.

* * * * *